Jan. 18, 1938.  R. R. CHAPPELL ET AL  2,106,083
MEANS FOR CONTROLLING CONDITIONS OR OPERATIONS
Filed Sept. 8, 1933  3 Sheets-Sheet 1
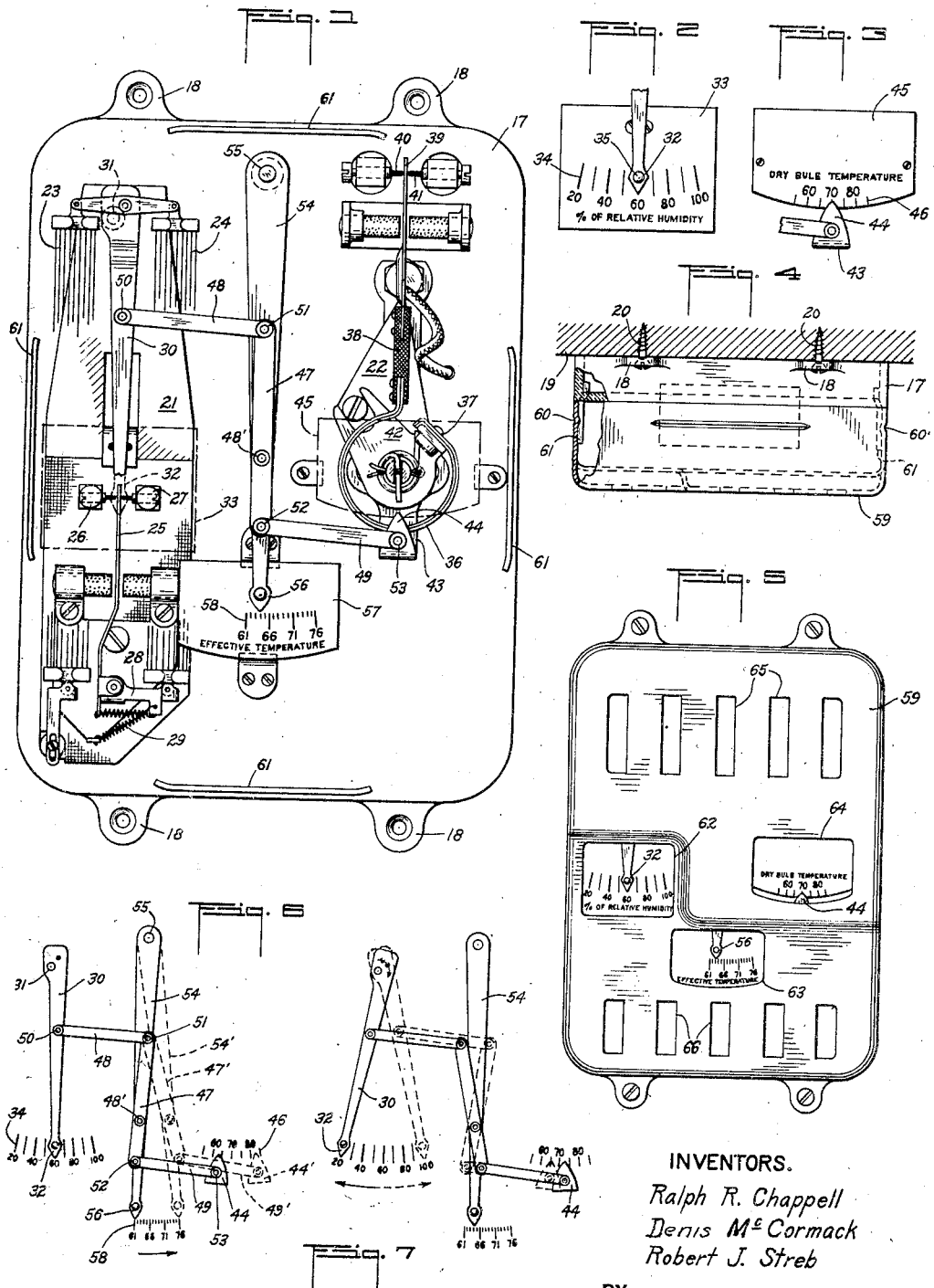
INVENTORS.
Ralph R. Chappell
Denis McCormack
Robert J. Streb
BY Stephen Cerstvik
ATTORNEY.

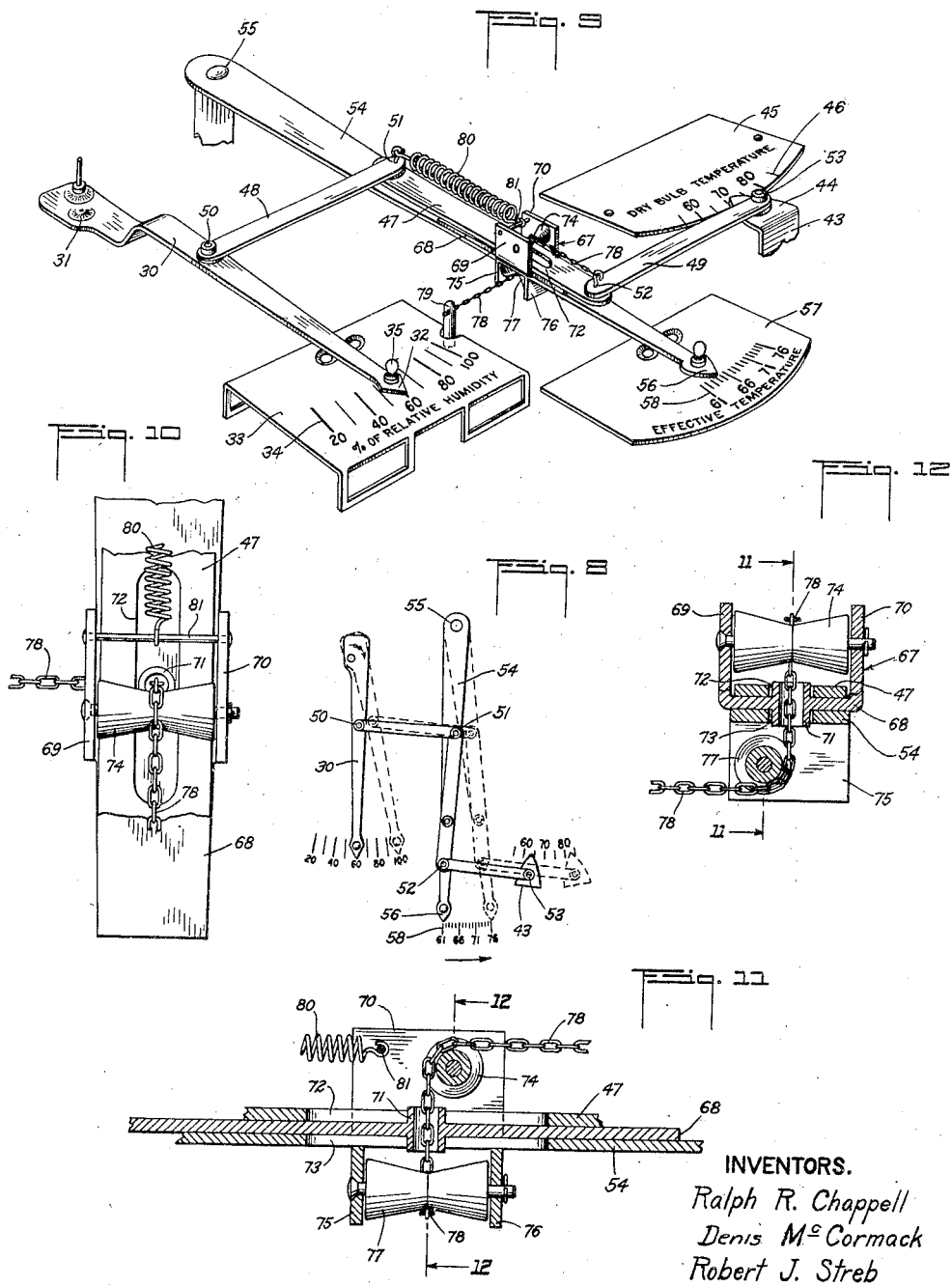

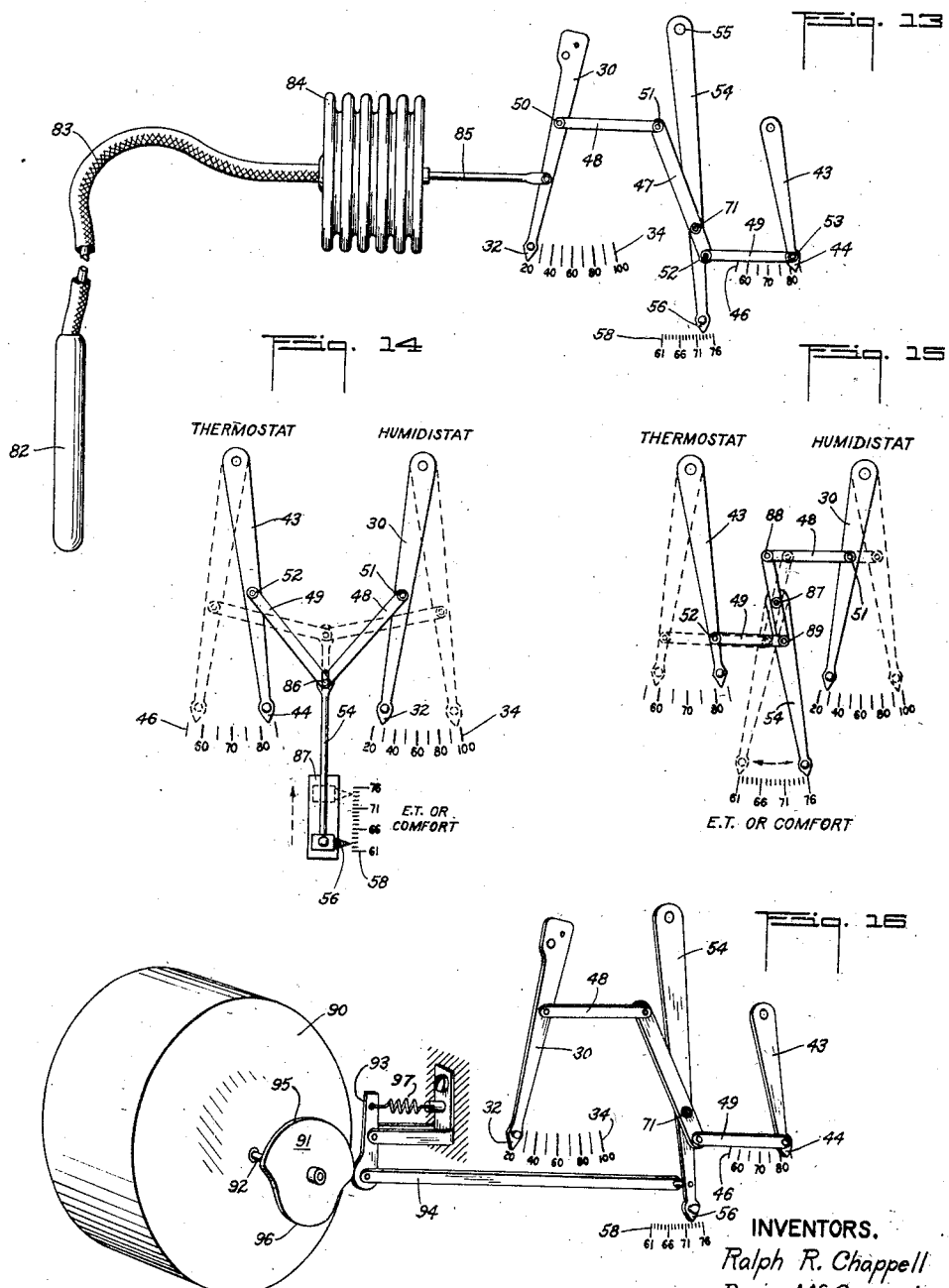

Patented Jan. 18, 1938

2,106,083

UNITED STATES PATENT OFFICE

2,106,083

MEANS FOR CONTROLLING CONDITIONS OR OPERATIONS

Ralph R. Chappell, Richmond, Va., and Denis McCormack, Lutherville, and Robert J. Streb, Baltimore, Md., assignors to Bendix Aviation Corporation, South Bend, Ind., a corporation of Delaware Application September 8, 1933, Serial No. 688,698

33 Claims. (Cl. 236—44)

The present invention relates to means for controlling conditions or operations, and more particularly to means for controlling two separate conditions to produce a resulting condition and in such a manner that either one or the other of the separate conditions may be changed to produce a related change in the other condition while maintaining the resulting condition constant.

The novel means embodying the invention are particularly adaptable for controlling air-conditioning systems having either heat supplying means and moisture supplying means or cooling means and de-humidifying means whereby one or the other of said supplies or means may be varied without changing the effective temperature or comfort condition within the space which is air-conditioned.

Heretofore, the control elements of an air-conditioning system comprised a humidity responsive device for controlling the supply of moisture in accordance with the relative humidity in the space to be air-conditioned, and a temperature responsive device or thermostat in no way mechanically connected to the humidity responsive device for controlling the supply of heat or the cooling effect in accordance with the dry-bulb temperature within said space. In order to obtain proper control of air-conditioning with apparatus of this type, it was necessary for a user of the system to consult charts and tables to determine at what values of humidity and temperature he should separately set the humidostat and thermostat in order that the system would produce a healthful and comfortable condition within the room or building employing the system. This healthful condition of comfort has been designated by the American Society of Heating and Ventilating Engineers as the "effective temperature" and is defined as an experimentally determined temperature which, unlike the dry-bulb and wet-bulb temperatures, is a true result of a person's feeling of warmth in all combinations of temperature, humidity and air motion. Reference is made to pages 313 to 340, inclusive, of the 1933 Guide of the above-mentioned society, for details as to how "effective temperature" tables have been arrived at and their relation to comfort conditions for the human body. In accordance with the present invention, air conditions may be controlled to maintain a constant effective temperature or condition of comfort which may be selected at the will of the operator and controlled in such a manner that either the supply of moisture or the supply of heat may be increased or decreased while maintaining the effective temperature constant.

Although, as pointed out above, the invention is particularly adapted to air-conditioning systems it may be employed for controlling other conditions or operations and, therefore, a broad object of the invention is to provide, in combination with means responsive to changes in certain conditions or operations and means responsive to changes in certain other conditions or operations bearing a relation to the first conditions or operations, novel means for simultaneously adjusting said first and second means in such a manner that adjustment of either means simultaneously adjusts the other according to a predetermined ratio whereby a predetermined resulting condition or operation is controlled.

Another object is to provide, in an apparatus for use in an air-conditioning system for controlling the latter to maintain desired conditions of comfort in a closed space such, for example, as a room or building, a novel combination including a temperature responsive device for controlling the system to maintain a predetermined temperature, a humidity responsive device for controlling the system to maintain a predetermined relative humidity, and means for simultaneously adjusting said temperature responsive device and said humidity responsive device in such a manner that adjustment of either device simultaneously adjusts the other according to a predetermined ratio whereby a predetermined effective temperature of comfort is produced in the closed space by the system.

Another object of the invention is to provide, in a device of the class described, novel means whereby the adjustment ratio between the temperature responsive device and the humidity responsive device may be varied automatically during a setting to obtain control of any predetermined effective temperature of comfort in the closed space by the air-conditioning system in which the device is employed.

Another object is to provide a novel adjustment linkage between a humidity responsive device and a temperature responsive device operable to vary humidity and/or temperature to maintain a predetermined effective temperature or comfort condition and to automatically readjust the humidity or temperature to retain the same effective temperature or comfort condition.

Another object of the invention is to provide a novel control device that will guide the user thereof in the proper control of air conditions in accordance with a comfort scale derived from a control of air conditions based on the proper combination of humidity and dry-bulb temperature to produce comfortable values of effective temperature.

Another object is to provide a novel device having a linkage comprising a pair of adjusting index levers, a dial or scale for each lever, said dials or scales being calibrated in different but related units, and means interconnecting said levers in such a manner that movement of one causes a simultaneous movement of the other according to a predetermined ratio existing between the units of the scales.

Another object is to provide novel means for controlling air conditions in a closed space whereby the humidity may be varied while maintaining the effective temperature or comfort condition constant in order to prevent condensation on windows or other relatively cool surfaces within or surrounding the closed space.

A further object is to provide novel means for controlling air conditions in a closed space, such as a room, whereby comfortable air conditions are automatically maintained while operating an air-conditioning system at relatively high humidities and, therefore, lower dry-bulb temperatures, thereby deriving maximum economy in heating.

Still another object is to provide a novel device for controlling air-conditioning systems in accordance with changes in outside temperature conditions so as to vary the inside dry-bulb temperature and relative humidity according to a predetermined ratio between said dry-bulb temperature and relative humidity whereby a constant inside effective temperature or comfort condition is obtained.

A still further object is to provide novel means for controlling air conditions in a room or building whereby the effective temperature or desired comfort condition in the room may be automatically changed at a desired time from one value to another and maintained constant thereafter.

The above and other objects and advantages of the invention will appear more fully hereinafter from a consideration of the detailed description taken together with the accompanying drawings wherein several embodiments of the invention are illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views, Fig. 1 is a plan view, with the cover removed and parts broken away, of one form of apparatus embodying the present invention;

Fig. 2 is a plan view of a portion of the humidity responsive device showing the relative humidity scale;

Fig. 3 is a similar view of a portion of the temperature responsive device or thermostat;

Fig. 4 is a top view of the device shown in Fig. 1 with a cover thereon and secured to a wall;

Fig. 5 is a front or plan view of Fig. 4;

Fig. 6 is a diagrammatic view showing the manner of setting the device of Fig. 1 for an effective temperature;

Fig. 7 is another diagrammatic view showing the manner of readjusting the dry-bulb temperature or the relative humidity without changing the effective temperature or comfort condition;

Fig. 8 is a diagrammatic view of another embodiment of the invention wherein a movement of the effective temperature pointer produces simultaneous setting movements of the dry-bulb temperature and the humidity pointers according to a predetermined ratio;

Fig. 9 is a perspective view of another embodiment of the invention showing only the control levers and cooperating scales;

Fig. 10 is a partial detail plan view of Fig. 9 illustrating the novel means for varying the ratio between the relative humidity and dry-bulb temperature controls upon a change in the adjustment of the effective temperature or comfort condition;

Fig. 11 is a partial sectional view taken on line 11—11 of Fig. 12;

Fig. 12 is another partial sectional view taken on line 12—12 of Fig. 11;

Fig. 13 is a more or less diagrammatic view illustrating another embodiment of the invention wherein settings of humidity and dry-bulb temperatures are controlled by outside temperatures and which may be employed with any of the embodiments shown in Figs. 1, 8, and 9, respectively;

Fig. 14 is a diagrammatic view of a further embodiment of the invention wherein the temperature and humidity elements are arranged to require their adjusting levers to be moved in opposite directions for obtaining an effective temperature or comfort setting;

Fig. 15 is a diagrammatic view of still another embodiment of the invention wherein movement of the setting levers is in opposite directions and by different amounts; and Fig. 16 is a diagrammatic view of a still further embodiment wherein setting of the effective temperature is controlled by a clock and which may be used with any of the preceding embodiments.

The novel means for carrying out the novel method of the present invention, when used for controlling air-conditioning systems, comprise two sensitive elements, one of which is responsive to dry-bulb temperatures and the other to relative humidity within a space to be air-conditioned such, for example, as a room or building. The first element may be, for example, of the bi-metallic thermal type and the second of the hygroscopic type embodying any suitable hygroscopic material such as human hairs. A device of this latter type is disclosed and claimed in a co-pending application of Streb, Chappell and Meagher, Serial No. 631,708, filed September 3, 1932, now Patent No. 1,998,340, dated April 16, 1935. Since neither the temperature responsive device nor the humidity responsive device per se form a part of the present invention the specific structure thereof need not be described herein in detail.

The above-mentioned two sensitive elements are so mounted, constructed and arranged as to actuate respective associated suitable contacts of either the open type or the mercury tube type, and each set of contacts arranged for either two-wire or three-wire electrical connections to the air-conditioning apparatus such as a humidifier or de-humidifier and heater or cooler, the latter choice namely between heater and cooler depending upon whether the air-conditioning apparatus is employed for the purpose of maintaining a comfort condition or effective temperature of warmth in the winter time or an effective comfortable and cool temperature in the summer time. Each of the sensitive elements is capable of independent electrical switching of its associated set of contacts as affected by its respective condition of the air within the space for controlling the air-conditioning apparatus to supply or take away heat and moisture to or from the space in accordance with the dry-bulb temperature and humidity, respectively, within the space. Each sensitive device is provided with a setting pointer and a cooperating scale, one scale being calibrated in dry-bulb temperatures and the other in per cent of relative humidity.

In accordance with the present invention, the temperature and humidity control pointers are so interlinked with each other that a movement of either pointer will cause the other pointer to take the correct setting, according to a predetermined ratio between temperature and relative humidity, to achieve control of the air-conditioning system at a predetermined resulting effective temperature or comfort condition or other desirable condition of both temperature and relative humidity. The interlinkage of the setting pointers of the two portions of the device may be arranged in any suitable or convenient manner to obtain the desired adjustment and control, several such arrangements being illustrated in the accompanying drawings and which will be explained more fully hereinafter.

It is also desirable to provide a third or pilot lever or pointer interlinked with and arranged to actuate the humidity and temperature pointers either individually or simultaneously in correct relation, i. e., according to a predetermined ratio between temperature and relative humidity. Thus, the third pointer becomes the actual setting pointer for the complete device and may be provided with a suitable cooperating scale calibrated in effective temperatures or conditions of comfort.

Referring now to the drawings, and more particularly to Figs. 1 to 5, inclusive, one form of the device embodying the present invention comprises, as shown, a base plate 17, preferably of some suitable insulating material, provided with ears or lugs 18 for mounting the instrument on a suitable support such as a wall 19 (Fig. 4) by means of fastening devices such as screws 20. Mounted on the base plate 17 are the two sensitive elements 21 and 22, respectively, the former, in the present case, being the humidity responsive device and the latter the temperature responsive device or thermostat.

The humidity responsive device or humidostat is, preferably, of the type disclosed in the aforementioned co-pending application Serial No. 631,708, now Patent No. 1,998,340, dated April 16, 1935, and consists of two sets of human hairs, but may be of any other suitable type, portions of which are shown at 23 and 24, said sets of hairs being connected in a manner (not shown herein) to operate a movable contact 25 which cooperates with a pair of fixed contacts 26 and 27, respectively, to open and/or close the latter when a predetermined relative humidity is reached, the movement of the movable contact 25 being accomplished through a system of links 28 and springs 29. An adjusting lever 30 is provided which is pivoted at 31 for adjusting the movable contact 25 through the sets of human hairs 23 and 24 so that said movable contact may be operated at any predetermined relative humidity. The end of the adjusting lever 30 is formed to constitute a pointer 32 for cooperation with a suitable dial 33 (Fig. 2) provided with a scale 34 calibrated, in the present instance, in per cent of relative humidity. A suitable knob 35 may be provided on the end of the pointer 32 for moving the latter across the scale 34 to adjust the movable contact 25 into the proper position with respect to the fixed contacts 26 and 27. As pointed out hereinbefore, contacts 25, 26, and 27 may be connected through a suitable circuit to a humidifying or de-humidifying apparatus for supplying moisture to or removing moisture from the space which is being air-conditioned.

The temperature responsive device or thermostat 22 consists of a bi-metallic strip 36 arranged in the form of a loop one end of which is fixed at 37 and the other end of which is movable and carries an armature 38 on which is mounted a movable contact 39 which cooperates with a pair of fixed contacts 40 and 41, respectively. A suitable adjusting mechanism, shown generally at 42, is provided for adjusting the looped bi-metallic strip 36 whereby the movable contact 39 will be actuated to be opened and/or closed with the cooperating fixed contacts 40 and 41 at a predetermined temperature. Associated and movable with the adjusting mechanism 42 is a lever 43 which is provided with a pointer 44 adapted to cooperate with a suitable dial 45 (Fig. 3) having a scale 46 calibrated, in the present instance, in dry-bulb temperatures. The contacts 39, 40, and 41 may be connected through suitable circuits to a heater or furnace or to a cooler for operating the same to supply heat to or take away heat from the space being air-conditioned whereby the temperature in the space may be controlled and maintained at a predetermined value.

The elements thus far described, in their general form, are old and have been employed separately for controlling the humidity and temperature within a closed space such as a room or building. With such separate control of the humidostat and thermostat it was necessary to consult charts and tables to determine at what values of humidity and temperature the devices should be set in order that the air-conditioning system would produce a healthful and comfortable condition within the room or building. As a matter of fact, the devices were set to operate at humidities and temperatures which were thought to give reasonable conditions of comfort but without determination of a predetermined definite ratio therebetween which would give an exact effective temperature or condition of comfort which is a true result of a person's feelings of warmth in all combinations of temperature and humidity as determined by the American Society of Heating and Ventilating Engineers.

It is, therefore, desirable to provide means whereby the humidity responsive device and temperature responsive device may be adjusted simultaneously according to a predetermined ratio between the relative humidity and the dry-bulb temperature to maintain a predetermined effective temperature or comfort condition and whereby either the humidity or dry-bulb temperature may be readjusted without altering the effective temperature or comfort condition. For this purpose, there is provided a novel adjustment linkage between the humidity responsive device and the temperature responsive device and, in the form shown, comprises an arm 47 which is pivoted at 48' and the ends of which are connected to the levers 30 and 43 by means of links 48 and 49, respectively, the ends of the former being pivoted at 50 and 51 on the lever 30 and arm 47, respectively, and the ends of the other being pivoted at 52 and 53 on the arm 47 and lever 43, respectively. From this arrangement it will be seen that if the adjusting lever 30 is moved to the left the adjusting lever 43 will be moved simultaneously to the right through the arm 47 and links 48 and 49. The ratio of movement between the levers 30 and 43 being the ratio of the distance between 48' and 51 to the distance between 48' and 52 and consequently such ratio may be varied by shifting the position of pivot 48' to vary the distances between 48' and 51 and 48' and 52. The proper ratio at which the levers 30 and 43 should move simultaneously is determined by the ratio existing between the relative humidity and the dry-bulb temperature for a desired effective temperature or condition of comfort.

It is further desirable to indicate the effective temperature or comfort condition obtained by the adjustment of the humidostat 21 and thermostat 22 and/or to adjust said devices independently or simultaneously and novel means are provided for this purpose, which comprise, in the form shown, a third or pilot lever 54 pivoted at one end on the base 17 at 55, having its other end shaped in the form of a pointer 56 so as to cooperate with a suitable dial 57 having a scale 58 calibrated in terms of effective temperature. With the provision of the pilot or adjusting lever 54, the pivot 48' of the arm 47 is carried by said lever 54 and by properly proportioning the friction at pivots 50, 51, 52, 53, and 55 by the use of a slotted sleeve fitting over the pivot pins, by varying the sizes of the pins and various other means, the arm 47 and links 48 and 49 may be made to operate so that movement of the pilot lever 54 will move only the lever 43 while the lever 30 remains stationary, thus adjusting the thermostat 22 for a desired effective temperature as indicated by the pointer 56 on the scale 58 but thereafter if it be desired to adjust the relative humidity by means of the lever 30 then the lever 43 will be moved simultaneously to adjust the thermostat according to a predetermined ratio to maintain the effective temperature for which the instrument has been set according to the scale 58. Such an adjustment is particularly desirable for altering the humidity to prevent undesirable condensation on windows or cool surfaces within the room which is being air-conditioned and at the same time preserving the effective temperature. For example, if it be desired to maintain an effective temperature or comfort condition of 64° and it is found that the humidity produced under the control of the humidostat 21 is too high, thereby causing fogging of the windows in the room, the lever 30 is moved so that its pointer 32 indicates a lower percentage of relative humidity on the scale 34 but by virtue of the linkage 47, 48, and 49 the lever 43 of the thermostat is also moved and according to the ratio existing between the humidity and dry-bulb temperature at the effective temperature which it is desired to maintain so that in spite of the change in relative humidity the effective temperature or comfort condition will remain unchanged.

Referring to Figs. 6 and 7, there is shown diagrammatically the manner of operation of the linkage described above. In Fig. 6 a setting is made for an effective temperature of 76°, for example, by moving the pointer 56 and, hence, lever 54 until the pointer is adjacent the 76 mark on the scale 58, the new position of the lever 54 being indicated in dotted lines at 54'. In this adjustment the lever 30 remains stationary but the pointer 44 is moved from a dry-bulb temperature of about 64° to a dry-bulb temperature of about 82° by means of the arm 47 and link 49, the new position of the pointer 44, arm 47 and link 49 being shown at 44', 47' and 49', respectively.

In Fig. 7 there is shown, in full lines, an adjustment for an effective temperature of 64° corresponding to a dry-bulb temperature of about 72° and a relative humidity of about twenty per cent. If it now be desired to increase the relative humidity the lever 30 is moved to the right until its pointer 32 indicates the desired increased relative humidity such, for example, as one hundred per cent and such movement of the lever 30 causes a simultaneous movement of the thermostat pointer 44 and, hence, its lever in an opposite direction according to a ratio such that the effective temperature of 64° remains unaltered, the change in the dry-bulb temperature being a decrease to a tempertéure of about 65°, thereby permitting, under these conditions, operation of an air-conditioning system at higher humidities and lower dry-bulb temperatures while maintaining a condition of comfort, thus affording greater economy in heating. The values indicated in connection with Figs. 6 and 7, however, are not representative of any particular effective temperature and are used merely to indicate in a general way the manner of operation of the novel linkage provided for accomplishing the required setting in the desired manner.

A cover 59 is provided in order to protect the humidostat 21 and thermostat 22 and may be secured to the base 17 in any suitable manner as by means of indentations 60 (Fig. 4) provided on the periphery of the cover and extending inwardly to engage corresponding indentations on cooperating members 61 carried by the base on the four sides thereof as shown in Fig. 1. The cover is provided with three windows 62, 63, and 64 through which the humidity, effective temperature, and dry-bulb temperature scales, respectively, are visible and through which the pointers 32, 56, and 44 and, hence, their respective levers may be adjusted. The cover 59 is also provided with a series of openings 65 in the upper part thereof and a series of similar openings 66 in the lower part thereof in order to admit air into the instrument and provide proper circulation thereof so that the humidostat and thermostat may be operated by changes in the conditions of the air circulating therethrough.

Referring to Fig. 8, there is illustrated another embodiment of the invention wherein, by adjusting the friction at pivots 50, 51, 52, 53, and 55, the levers 30, 43, and 54, are so arranged that movement of the lever 54 simultaneously moves levers 30 and 43 in a proper ratio along their scales so that the combination of humidity and dry-bulb temperature will be equal to the effective temperature indicated by the pointer 56 of the scale 58 and so that, thereafter, a change in setting of the humidity or dry-bulb temperature will produce a change in the other setting according to a ratio without altering the effective temperature for which the instrument was initially set as indicated on the effective temperature scale 58. The full lines indicate an initial setting of the humidostat and thermostat for one predetermined effective temperature and the dotted lines show a change in the setting of said elements for another effective temperature by movement of the pilot lever 54.

If it be desired to control air conditions in only a limited range of effective temperatures as, for example, between 66° and 71°, which are the average winter and summer temperatures of comfort, respectively, then a fixed ratio of movement between levers 30 and 43 is satisfactory for all practical purposes. If, however, it be desired to obtain control in a wider range of effective temperatures as, for example, between 50° and 80°, as may be essential in industries where specific air conditions are a criterion in the manufacture of some product, then it is desirable to have a correct and exact ratio of movement between levers 30 and 43 for each setting of effective temperature. For this purpose novel means are provided in accordance with the present invention whereby the ratio of movement between levers 30 and 43 is automatically changed upon a movement of the pilot lever 54 to a new effective temperature so that, thereafter, any adjustment of one of the levers 30 or 43 will cause a simultaneous movement of the other according to the ratio existing between the humidity and dry-bulb temperature at that particular effective temperature. As illustrated in the embodiment shown in Figs. 9 to 12, inclusive, said means comprise an automatically adjustable linkage including the arm 47 and links 48 and 49 of the device shown in Fig. 1. This novel linkage is constituted by a sliding carriage mechanism 67 which carries arm 47 and which is pivotally movable therewith and longitudinally movable relative thereto. The carriage 67 comprises a flat guiding strip 68 (Fig. 9) located between arm 47 and pilot lever 54 and slidable longitudinally therebetween. Secured to or formed integrally with the strip 68 are a pair of lugs 69 and 70 projecting upwardly from either edge of the strip intermediate its ends and between which the arm 47 is located. Also secured to or formed integrally with the strip 68 is a hollow pivot member 71 (Figs. 11 and 12) located midway between the lugs 69 and 70 and projecting from the plane of the strip on both sides into longitudinal slots 72 and 73 formed in the arm 47 and lever 54, respectively. A roller 74 is journaled in the lugs 69 and 70 and tapers inwardly towards its center from both ends. The roller is located over the hollow pivot 71 for a purpose which will appear later. Another pair of lugs 75 and 76 are secured to or formed integrally with the lever 54 at the underside thereof at right angles to the lugs 69 and 70 directly beneath the latter, and journaled in these lugs is another roller 77 located under the hollow pivot 71. One end of a flexible chain 78 is secured to the pivot 52 of arm 47 and link 49. The chain 78 then passes over roller 74, down through the hollow pivot 71 and under roller 77 thereby changing its direction 90° with respect to the lever 54 in the plane thereof. The other end of the chain is secured to a pin 79 carried by a fixed part of the instrument as, for example, by the base 17 which is shown in Fig. 1 but not in Fig. 9, it being understood that the embodiment of Fig. 9 will be mounted in the same manner as that of Fig. 1 to operate the humidostat 21 and thermostat 22.

From the foregoing arrangement it will be seen that upon a movement of the lever 54 to the right on its pivot 55, i. e., away from the fixed pin 79, the length of the chain from the roller 74 to pivot 52 will tend to become shorter while the length of the chain from the pin 79 to roller 77 will become longer thereby causing a pull on the carriage 67 along lever 54 in a direction toward pivot 52 and moving the hollow pivot 71 in slots 72 and 73 on arm 47 and lever 54, thus changing the distances between pivot 71 and pivots 51 and 52, respectively. Pivot 71 is the pivot about which the arm 47 moves angularly when either the lever 30 or lever 43 are actuated.

In order to maintain the linkage in equilibrium and to cause the carriage 67 to be moved in the opposite direction when the pilot lever 54 is moved to the left, there is provided a tension spring 80 one end of which is secured to the pivot 51 and the other end to a pin 81 carried between and secured to lugs 69 and 70 (Figs. 9 and 10).

In order that lever 54 remains in its adjusted position on the scale 58 after a movement to the right, it is essential that the friction at pivot 55 be slightly greater than the tension of the spring 80 as otherwise the lever 54 would not remain in adjusted position because without the required friction at pivot 55 the lever 54 would move to the left due to a pull of the spring 80 on the carriage 67.

Thus it will be seen that the distances between pivot 71 and pivots 51 and 52, respectively, will be changed for each setting of pointer 56 along the scale 58 thereby changing the ratio of movement between levers 30 and 43 so when either of these is actuated by the other, that the correct ratio is had for each degree of effective temperature.

It may also be desirable to vary and control the air conditions within a closed space, particularly the humidity, in accordance with outside temperature conditions without altering the effective temperature or comfort condition in the closed space and which the instrument embodying the invention has been adjusted to maintain. For this purpose there is provided, in accordance with another object of the invention, a temperature responsive device which is exposed to the atmosphere exterior of the room or building and which may be connected either to the lever 30 or the lever 43 in order to control humidity or dry-bulb temperature in accordance with variations in the external temperature. Preferably the external device is connected to lever 30 in order that the humidity may be controlled to prevent condensation on windows and other cool surfaces within the room or building which is being air-conditioned. As illustrated in Fig. 13, this embodiment of the invention includes a temperature responsive device constituted by a hollow tube 82 of suitable heat conducting material and located at some suitable place outside of the room or building where it is exposed to external temperatures. The tube 82 is connected by means of a capillary conduit 83 to an expansible diaphragm device 84. The tube 82 and diaphragm 84 are sealed, except for their mutual connection through the conduit 83, and are filled with a suitable expansible fluid having a high heating conductivity and high expansible properties such, for example, as mercury, thus forming a closed system within which the fluid may expand and contract in accordance with the temperature to which tube 82 is exposed. The expansion and contraction of the fluid will then cause an expansion and contraction of the diaphragm device 84 such expansion and contraction being a function of the outside temperature. This movement of the diaphragm device 84 is employed to control the setting of the instrument embodying the present invention and in the present instance, as illustrated in Fig. 13, the diaphragm 84 is pivotally connected to the lever 30 by means of a link 85 rigidly secured to and movable with a wall of the diaphragm. From this arrangement it will be seen that if the humidity within the room or building is relatively high, when the outside temperature becomes low the fluid in the tube 82 and diaphragm 84 will contract thereby collapsing the diaphragm and moving the lever 30 to the left to reduce the humidity thereby preventing condensation on the windows or walls of the room or building due to the difference between the inside and outside temperatures. Obviously, the diaphragm 84 may be connected to the lever 43 instead of the lever 30, without departing from the scope of the invention and utilized to control the dry-bulb temperature within the room or building in accordance with prevailing external temperatures so that when the external temperature drops, a contraction of the diaphragm 84 is effective to move the lever 43 to the right to increase the dry-bulb temperature setting.

In Fig. 14 there is illustrated another embodiment of the invention which may be applied to any of the preceding embodiments and in which the pilot lever 54 and the links 48 and 49 are pivoted at a common point 86, the links 48 and 49 being in turn pivotally connected to the levers 30 and 43 at 51 and 52, respectively, as in Fig. 1 except that the levers 30 and 43 are transposed, i. e., the lever 30 is on the right and the lever 43 is on the left. The movement of the lever 54 and pointer 56 is limited to and guided in a channel 87 so that it moves longitudinally instead of angularly. An adjustment may be provided for adjusting the length of the links 48 and 49 in order to obtain a correct ratio of movement thereof to produce and maintain the effective temperature for which the instrument has been set by means of the pointer 56 along the scale 58.

In Fig. 15 is illustrated still another embodiment of an interlinkage of the setting levers when a movement of the levers 30 and 43 in opposite directions is required as in Fig. 14, but where the movement is in different amounts. In this case the pilot lever 54 is pivoted at a fixed point 87 intermediate its ends and the links 48 and 49 are pivoted to an extension integral with the lever 54, at 88 and 89, respectively, and to the levers 30 and 43 at 51 and 52, respectively, as before.

Referring now to Fig. 16 there is illustrated a still further embodiment of the invention wherein the effective temperature setting may be controlled in such a manner that one effective temperature or comfort condition is obtained at one time of the day as, for example, during the night, and another effective temperature is obtained during another part of the day as, for example, from early morning until late evening or night, because generally in dwellings it is desirable to have a lower effective temperature during the night and a high effective temperature during the day. For this purpose novel means are provided for automatically moving the pilot lever 54 at the desired times and, in the form shown, comprise a clockwork 90 for driving a cam 91 through a shaft 92. The cam operates a follower 93 which is connected to lever 54 by means of a link 94. The cam has two surfaces 95 and 96 which are so arranged with respect to the follower 93 that during the hours between 7 a. m. and about 11 p. m., for example, the follower keeps lever 54 at a higher effective temperature, and after 11 p. m. the surface 96 permits follower 93 to be moved clockwise by a spring 97, thereby moving lever 54 to the left to a lower effective temperature where it remains until about 7 a. m. when the raised surface 95 engages the follower 93 to move lever 54 to the right again. In this manner the effective temperature may be automatically changed at different times of the day so that one effective temperature is maintained during one part of the day and another during another part of the day. The cam surfaces 95 and 96 may be made adjustable in order that times at which the effective temperature is to be varied may be changed.

There is thus provided novel means for controlling two separate conditions or operations to produce a predetermined resulting condition or operation and in such a manner that either condition may be changed to produce a related change in the other condition while maintaining the resulting condition constant. As pointed out hereinbefore, the invention is particularly adapted for use in controlling air conditions within a room or building but may be used for controlling other conditions. By means of the invention, when employed in controlling air conditions in a room or building, not only will the operator or home owner be relieved from the necessity of consulting charts and tables to determine at what values he should set the thermostat and humidostat in order to produce a healthful and comfortable condition within the room or building, but it will be practically impossible to reach a condition of the atmosphere that is unbalanced in heat and humidity when applied to either summer or winter types of air-conditioning equipment. Besides the health and comfort conditions derived, greater economy of operation of the air-conditioning system is obtained. Also, automatic operation of the instrument may be obtained in accordance with external temperatures to vary the humidity, without changing the effective temperature, to prevent condensation on windows, etc. Further, it is possible to automatically change the effective temperature settings at different predetermined times of the day and to automatically vary the ratio of setting movement between the humidostat and thermostat for each setting of effective temperature.

Although several embodiments of the invention have been illustrated and described, other changes and modifications which will now be apparent to those skilled in the art, may be made in the form and relative arrangement of the parts without departing from the scope of the invention. It is also to be expressly understood that the device of the invention, when used to control air conditions, is applicable to air-conditioning equipment of several types, and the electrical connections from the controlling contacts to the humidifier or de-humidifier and heater or cooler may be made in accordance with any suitable or desirable circuit arrangement. Whether a "two-wire" or a "three-wire" system be used for controlling any particular piece of apparatus is immaterial and is merely a matter of choice or depending upon the construction of the equipment employed in any particular installation. Reference is, therefore, to be had to the appended claims for a definition of the limits of the invention.

What is claimed is:

1. In apparatus for use in an air-conditioning system for controlling the latter to maintain desired conditions of comfort in a closed space, the combination of an adjustable temperature responsive device for controlling the system to maintain a predetermined temperature in said space, an adjustable humidity responsive device for controlling the system to maintain a predetermined relative humidity in said space, and means whereby the temperature responsive device and the humidity responsive device may be simultaneously adjusted in accordance with the ratio existing between temperature and relative humidity for a predetermined effective temperature so as to cause said predetermined effective temperature of comfort to be produced in the closed space by the system, and means for simultaneously changing said ratio upon a change of adjustment for a different effective temperature.

2. In apparatus for use in an air-conditioning system for controlling the latter to maintain desired conditions of comfort in a closed space, the combination of an adjustable temperature responsive device for controlling the system to maintain a predetermined temperature in said space, an adjustable humidity responsive device for controlling the system to maintain a predetermined relative humidity in said space and means whereby the temperature responsive device and the humidity responsive device may be simultaneously adjusted in accordance with the ratio existing between temperature and relative humidity for a predetermined effective temperature so as to cause said predetermined effective temperature of comfort to be produced in the closed space by the system, and means associated with said adjusting means for indicating the effective temperature for which the devices are adjusted.

3. In an instrument for use in an air-conditioning system for controlling the latter to maintain a predetermined effective temperature in a closed space, the combination of a temperature responsive device for controlling the system to maintain a predetermined temperature in said space, a humidity responsive device for controlling the system to maintain a predetermined relative humidity in said space, means for adjusting said temperature responsive device for a predetermined dry-bulb temperature, means for adjusting said humidity responsive device for a predetermined relative humidity, second means for adjusting said temperature responsive device for a predetermined effective temperature, and means connecting said first temperature adjusting means and said humidity adjusting means for causing simultaneous movement of said two last named adjusting means independently of said effective temperature adjusting means and in accordance with the ratio existing between temperature and relative humidity for a predetermined effective temperature, whereby either a desired dry-bulb temperature or a desired relative humidity may be obtained without changing the effective temperature.

4. In apparatus for use in an air-conditioning system for controlling the latter to maintain desired conditions of comfort in a closed space, the combination of an adjustable temperature responsive device for controlling the system to maintain a predetermined temperature in said space, an adjustable humidity responsive device for controlling the system to maintain a predetermined relative humidity in said space, and means whereby the temperature responsive device and the humidity responsive device may be simultaneously adjusted in accordance with the ratio existing between temperature and relative humidity for a predetermined effective temperature so as to cause said predetermined effective temperature of comfort to be produced in the closed space by the system, means for simultaneously changing said ratio upon a change of adjustment for a different effective temperature, and means associated with said adjusting means for indicating the effective temperature for which the devices are adjusted.

5. In an instrument for use in an air-conditioning system for controlling the latter to maintain a predetermined effective temperature in a closed space, the combination of a temperature responsive device for controlling the system to maintain a predetermined temperature in said space, a humidity responsive device for controlling the system to maintain a predetermined relative humidity in said space, means for adjusting said temperature responsive device for a predetermined dry-bulb temperature, means for adjusting said humidity responsive device for a predetermined relative humidity, second means for adjusting said temperature responsive device for a predetermined effective temperature, means connecting said first temperature adjusting means and said humidity adjusting means for causing simultaneous movement of said two last named adjusting means independently of said effective temperature adjusting means and in accordance with the ratio existing between temperature and relative humidity for a predetermined effective temperature, whereby either a desired dry-bulb temperature or a desired relative humidity may be obtained without changing the effective temperature, and means cooperating with said effective temperature adjusting means for indicating the effective temperature for which the two devices are adjusted.

6. In combination, control means responsive to changes in certain conditions or operations, a second control means responsive to changes in certain other conditions or operations affected by and bearing a relation to the first conditions or operations, and means whereby said first and second control means may be both adjusted in accordance with the ratio existing between the two conditions or operations for a predetermined resulting condition or operation so as to control said predetermined resulting condition or operation, and means associated with said adjusting means for simultaneously varying said ratio upon a change in adjustment for a different resulting condition or operation.

7. In combination, means responsive to changes in certain conditions or operations, means responsive to changes in certain other conditions or operations affected by and bearing a relation to said first conditions or operations, separate means for adjusting each of said change responsive means, respectively, second means for adjusting one of said change responsive means to produce a third condition or operation which is a resultant of the first two conditions or operations, means associated with said last-named adjusting means for indicating the resulting condition or operation, and means connecting the first two adjusting means for causing movement thereof simultaneously according to a predetermined ratio whereby either of the two component conditions or operations may be varied to produce a desired effect without changing the resulting condition or operation.

8. In combination, means responsive to changes in certain conditions or operations, means responsive to changes in certain other conditions or operations affected by and bearing a relation to said first conditions or operations, separate means for adjusting each of said change responsive means, respectively, second means for adjusting one of said change responsive means to produce a third condition or operation which is a resultant of the first two conditions or operations, means associated with said last-named adjusting means for indicating the resulting condition or operation, means connecting the first two adjusting means for causing movement thereof simultaneously according to a predetermined ratio whereby either of the two component conditions or operations may be varied to produce a desired effect without changing the resulting condition or operation, and means responsive to a fourth condition or operation and connected to one of the first two adjusting means for automatically controlling the latter in response to changes in said fourth condition or operation.

9. In apparatus for use in an air-conditioning system for controlling the latter to produce and maintain a desired effective temperature in a closed space and resulting from a combination of dry-bulb temperature and humidity, a temperature responsive device for controlling the system to maintain a predetermined dry-bulb temperature in said space, a humidity responsive device for controlling the system to maintain a predetermined humidity in said space, means for adjusting said temperature responsive device for a predetermined dry-bulb temperature, means for adjusting said humidity responsive device for a predetermined humidity, means associated with said adjusting means for adjusting the system for a predetermined effective temperature, and means whereby the temperature responsive device and the humidity responsive device may be simultaneously adjusted in accordance with the ratio existing between temperature and relative humidity for a predetermined effective temperature so as to cause either the dry-bulb temperature or the humidity to be varied without changing the effective temperature, and means connected to one of the first two adjusting means and responsive to outside temperatures for controlling the system in accordance with changes in said outside temperatures without affecting the effective temperature within the space.

10. In apparatus for use in an air-conditioning system for controlling the latter to maintain a predetermined effective temperature in a closed space and resulting from a combination of dry-bulb temperature and relative humidity, a temperature responsive device for controlling the system to maintain a predetermined dry-bulb temperature in the space, a humidity responsive device for controlling the system to maintain a predetermined humidity in said space, and means whereby the temperature responsive device and the humidity responsive device may be simultaneously adjusted in accordance with the ratio existing between temperature and relative humidity for a predetermined effective temperature so as to cause said predetermined effective temperature of comfort to be produced in the closed space by the system, and time controlled means connected to said adjusting means for adjusting the system to produce and maintain one effective temperature during one predetermined interval of time and to produce and maintain a different effective temperature during another predetermined interval of time.

11. In apparatus for use in an air-conditioning system for controlling the latter to maintain a predetermined effective temperature in a closed space and resulting from a combination of dry-bulb temperature and relative humidity in said space, a temperature responsive device for controlling the system to maintain a predetermined dry-bulb temperature in said space, a humidity responsive device for controlling the system to maintain a predetermined relative humidity in said space, means for adjusting said temperature device for a predetermined dry-bulb temperature, means for adjusting said humidity device for a predetermined relative humidity, means associated with said two adjusting means for adjusting the system to maintain a predetermined effective temperature, and means whereby the temperature responsive device and the humidity responsive device may be simultaneously adjusted in accordance with the ratio existing between temperature and relative humidity for a predetermined effective temperature and independently of said third adjusting means whereby the temperature or humidity may be changed without changing the effective temperature, and time controlled means connected to said effective temperature adjusting means for adjusting the system to produce and maintain one effective temperature during one predetermined interval of time and to produce and maintain a different effective temperature during another predetermined interval of time.

12. In apparatus for use in an air-conditioning system for controlling the latter to produce and maintain a predetermined effective temperature in a closed space and which effective temperature is a combination of dry-bulb temperature and humidity, a dry-bulb temperature responsive control device, a humidity responsive control device, means for setting said control devices for causing the system to maintain a predetermined dry-bulb temperature and a predetermined humidity, respectively, in said closed space, and means connecting said control devices for adjusting the system to produce different effective temperatures irrespective of the values for which either the temperature responsive control device or the humidity responsive control device have been previously adjusted.

13. In apparatus for use in an air-conditioning system for controlling the latter to produce and maintain a predetermined effective temperature in a closed space and which effective temperature is a combination of dry-bulb temperature and humidity, a dry-bulb temperature responsive control device, a humidity responsive control device, means for setting said control devices for causing the system to maintain a predetermined dry-bulb temperature and a predetermined humidity, respectively, in said closed space, means connecting said control devices for adjusting the system to produce a predetermined effective temperature irrespective of the values for which either the temperature responsive control device or the humidity responsive control device have been previously adjusted, and time-controlled means connected to said effective temperature adjusting means for operating the latter so that the control devices are adjusted to cause the system to produce and maintain one effective temperature during one predetermined interval of time and to produce and maintain a different effective temperature during another predetermined interval of time.

14. In combination, a temperature responsive device, a humidity responsive device, means for adjusting said devices for predetermined values of dry-bulb temperature and humidity, respectively, and including a connection between said devices so that adjustment of one produces a simultaneous adjustment of the other according to a predetermined ratio to produce an effective temperature which is a combination of dry-bulb temperature and humidity, and means for adjusting the temperature device independently of said humidity device for a predetermined effective temperature corresponding to a dry-bulb temperature at the relative humidity at which the humidity device is initially adjusted.

15. In combination, a dry-bulb temperature responsive device having an adjusting lever, a humidity responsive device also having an adjusting lever, and means including a third adjusting lever, an arm pivoted intermediate its ends on said last named lever, a link connecting one end of said arm to the temperature adjusting lever, and a second link connecting the other end of said arm to the humidity adjusting lever, said arm and links being so arranged with respect to the three adjusting levers that movement of one of the first two levers causes a simultaneous movement of the other according to a predetermined ratio and independently of the third adjusting lever and so that movement of the third lever causes simultaneous movement of the temperature adjusting lever independently of but limited by the humidity adjusting lever.

16. In combination, a temperature responsive device having an adjusting lever, a humidity responsive device also having an adjusting lever, and means including a third adjusting lever and a mechanical connection between said third lever and said first two levers whereby a movement of one of the first two levers causes a simultaneous movement of the other according to a predetermined ratio and whereby a movement of the third lever causes a simultaneous movement of the temperature adjusting lever independently of but limited by the humidity adjusting lever.

17. In combination, a temperature responsive control device having an adjusting lever therefor, a humidity responsive control device having a separate adjusting lever therefor, and a third adjusting lever having means pivoted thereon connecting the other two adjusting levers for simultaneously adjusting said control devices according to a predetermined ratio whereby different effective temperatures may be obtained with any desired humidity or temperature.

18. In combination, a temperature responsive control device having an adjusting lever therefor, a humidity responsive control device having a separate adjusting lever therefor, a third adjusting lever having means pivoted thereon connecting the other two adjusting levers for simultaneously adjusting said control devices according to a predetermined ratio, and time-controlled means for operating said third lever whereby two different effective temperatures may be obtained.

19. In combination, a temperature responsive control device having a pivoted adjusting lever therefor, a humidity responsive control device also having a pivoted adjusting lever therefor, and a third pivoted adjusting lever for the said control devices and having means pivoted thereon connecting the other two adjusting levers in such a manner that movement of one of said first two levers causes a simultaneous movement of the other according to a predetermined ratio existing between temperature and relative humidity at a desired effective temperature.

20. In combination, a temperature responsive control device having a pivoted adjusting lever therefor, a humidity responsive control device also having a pivoted adjusting lever therefor, a third pivoted adjusting lever for said control devices and having means pivoted thereon connecting the other two adjusting levers in such a manner that movement of one of said first two levers causes a simultaneous movement of the other according to a predetermined ratio existing between temperature and relative humidity, and means controlled by the movement of said third lever for varying the ratio of movement between said first two levers.

21. In combination, a temperature responsive device having adjusting means therefor, a humidity responsive device also having adjusting means therefor, and means connecting said two adjusting means in such a manner that an adjusting movement of one causes a simultaneous adjusting movement of the other according to a predetermined ratio between temperature and humidity at different desired effective temperatures.

22. In combination, a temperature responsive device having adjusting means therefor, a humidity responsive device also having adjusting means therefor, means connecting said two adjusting means in such a manner that an adjusting movement of one causes a simultaneous adjusting movement of the other according to a predetermined ratio, and means for adjusting the ratio of movement between said first two adjusting means.

23. In an air-conditioning control device including an adjustable temperature responsive device having relatively movable electrical contacts operated thereby for opening and closing an electrical circuit of a heating or cooling unit at a predetermined temperature in an enclosure, and an adjustable humidity responsive device having relatively movable electrical contacts operated thereby for opening and closing an electrical circuit of a humidifying or de-humidifying unit at a predetermined relative humidity in said enclosure, the combination with said devices, of means connecting them for simultaneous adjustment according to the ratio existing between temperature and relative humidity to obtain a desired effective temperature in the enclosure, means for adjusting said devices through said connecting means to vary the effective temperature, and means for adjusting one of said devices through said connecting means to obtain a desired change in the condition controlled by said device and in such a manner that the other device is simultaneously adjusted according to said ratio to produce a change in the other condition controlled by the second device to balance the change in the first condition whereby the effective temperature remains unchanged.

24. In an air-conditioning control device including an adjustable temperature responsive device having relatively movable electrical contacts operated thereby for opening and closing an electrical circuit of a heating or cooling unit at a predetermined temperature in an enclosure, an adjustable humidity responsive device having relatively movable electrical contacts operated thereby for opening and closing an electrical circuit of a humidifying or de-humidifying unit at a predetermined relative humidity in said enclosure, the combination with said devices, of means connecting them for simultaneous adjustment according to the ratio existing between temperature and relative humidity to obtain a desired effective temperature in the enclosure, means for adjusting said devices through said connecting means to vary the effective temperature, and means for adjusting the humidity responsive device through said connecting means to obtain a desired change in relative humidity in the enclosure and in such a manner that the temperature responsive device is simultaneously adjusted according to said ratio to produce a change in the dry-bulb temperature in said enclosure to balance the change in the relative humidity whereby the effective temperature remains unchanged.

25. In an air-conditioning control device including an adjustable temperature responsive device having relatively movable electrical contacts operated thereby for opening and closing an electrical circuit of a heating or cooling unit at a predetermined temperature in an enclosure, and an adjustable humidity responsive device having relatively movable electrical contacts operated thereby for opening and closing an electrical circuit of a humidifying or de-humidifying unit at a predetermined relative humidity in said enclosure, the combination with said devices, of means connecting them for simultaneous adjustment according to the ratio existing between temperature and relative humidity to obtain a desired effective temperature in the enclosure, means for adjusting said devices through said connecting means to vary the effective temperature, and means for adjusting the temperature responsive device through said connecting means to obtain a desired change in the dry-bulb temperature in the enclosure and in such a manner that the humidity responsive device is simultaneously adjusted according to said ratio to produce a change in the relative humidity in said enclosure to balance the change in the dry-bulb temperature whereby the effective temperature remains unchanged.

26. In apparatus for use in an air-conditioning system for controlling the latter to maintain a predetermined effective temperature in an enclosure and resulting from a combination of temperature and relative humidity, a temperature-responsive device for controlling the system to maintain a predetermined temperature in said enclosure, a humidity-responsive device for controlling the system to maintain a predetermined relative humidity in said enclosure, and means connected to said devices for simultaneously adjusting them according to a predetermined ratio to control the system for maintaining a predetermined effective temperature in said enclosure, and means for adjusting the humidity-responsive device for a predetermined relative humidity while maintaining its ratio to the temperature-responsive device whereby the humidity in said enclosure may be changed without changing the effective temperature for which the system has been adjusted.

27. In apparatus for use in an air-conditioning system for controlling the latter to maintain a desired condition of comfort in an enclosure, the combination of an adjustable temperature-responsive device for controlling the system to maintain a predetermined temperature in said enclosure, an adjustable humidity-responsive device for controlling the system to maintain a predetermined relative humidity in said enclosure, means for simultaneously adjusting said devices according to a ratio whereby a predetermined effective temperature is produced in said enclosure by the system, means for indicating the relative humidity for which the system is adjusted, means for indicating the effective temperature for which the system is adjusted, and means for adjusting the humidity-responsive device for a predetermined relative humidity while simultaneously adjusting the temperature-responsive device according to said ratio without changing either the effective temperature for which the system has been adjusted or the indication of said effective temperature.

28. In apparatus for use in an air-conditioning system for controlling the latter to maintain a desired condition of comfort in an enclosure, the combination of an adjustable temperature-responsive device for controlling the system to maintain a predetermined temperature in said enclosure, an adjustable humidity-responsive device for controlling the system to maintain a predetermined relative humidity in said enclosure, means for simultaneously adjusting said devices according to a ratio whereby a predetermined effective temperature is produced in said enclosure by the system, means for indicating the relative humidity for which the system is adjusted, means for indicating the effective temperature for which the system is adjusted, means for adjusting the humidity-responsive device for a predetermined relative humidity while simultaneously adjusting the temperature-responsive device according to said ratio without changing either the effective temperature for which the system has been adjusted or the indication of said effective temperature, and a temperature responsive device outside of said enclosure and responsive to outside temperatures and connected to one of said adjusting means for controlling the comfort condition in said enclosure in accordance with the outside temperature.

29. In combination, an adjustable humidostat and an adjustable thermostat located in an enclosure, means connecting said humidostat and thermostat together for simultaneous adjustment in accordance with the ratio existing between temperature and relative humidity for a predetermined effective temperature so as to cause an air-conditioning system, to which said devices are adapted to be connected, to maintain different desired effective temperatures in said enclosure, and an outdoor temperature-responsive device connected to said humidostat and thermostat for modifying their adjustments in accordance with outside temperatures.

30. In combination, an adjustable humidostat and an adjustable thermostat located in an enclosure, means connecting said humidostat and thermostat together for simultaneous adjustment in accordance with the ratio existing between temperature and relative humidity for a predetermined effective temperature so as to cause an air-conditioning system, to which said devices are adapted to be connected, to maintain said predetermined effective temperature in said enclosure, and time-controlled means connected to said humidostat and thermostat for changing their adjustments from one effective temperature to another at predetermined times.

31. In apparatus for use in an air-conditioning system for controlling the latter to maintain any desired effective temperature in a closed space, the combination of a temperature responsive device adjustable for controlling said system to maintain any desired temperature in said space while maintaining said temperature responsive device operable, a humidity responsive device adjustable for controlling said system to maintain a predetermined relative humidity in said space while maintaining said humidity responsive device operable, and means whereby said temperature responsive device and said humidity responsive device may be adjusted simultaneously and in accordance with the ratio existing between temperature and relative humidity for a predetermined effective temperature so that different desired effective temperatures may be produced in the closed space.

32. In apparatus for use in an air-conditioning system for controlling the latter to maintain any desired effective temperature in a closed space, the combination of a temperature responsive device and a humidity responsive device, means connecting said devices whereby they may be moved together in accordance with the ratio existing between temperature and relative humidity for a predetermined effective temperature, and adjusting means to set said devices at a different effective temperature while maintaining said connection between them.

33. In combination, a temperature responsive device, a humidity responsive device, means for adjusting said humidity device, means so connecting said devices that an adjustment of said humidity responsive device produces a simultaneous adjustment of the temperature responsive device according to a predetermined ratio to produce an effective temperature which is a combination of dry bulb temperature and humidity, and means for adjusting said temperature device independently of said humidity device whereby a different effective temperature is produced which is a combination of relative humidity and a different dry bulb temperature.

RALPH R. CHAPPELL.
DENIS McCORMACK.
ROBERT J. STREB.